Patented Feb. 14, 1950

2,497,839

UNITED STATES PATENT OFFICE 2,497,839

1-ALKYL-2,5-DIMETHYLPYRROLIDINES

Anderson W. Ralston, Chicago, and James Harwood, Western Springs, Ill., assignors to Armour and Company, Chicago, Ill., a corporation of Illinois No Drawing. Application March 16, 1944, Serial No. 526,811

5 Claims. (Cl. 260—313)

This invention relates to 1-alkyl-2,5-dimethylpyrrolidines and more specifically to such chemical compounds wherein the 1-alkyl radical contains at least 12 carbon atoms.

We have discovered a new family of nitrogen containing compounds which have characteristics that make them useful for a variety of purposes. For example, they are active as surface modifying agents, and many of them are particularly useful as emulsifiers or agents for the flotation separation of ores.

Our new compounds are the 1-aliphatic-2,5-dimethylpyrrolidines and their salts. The structural formula of the new compounds in the free state may be given as follows:

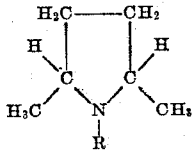

where R is an alkyl group containing 12 or more carbon atoms. The aliphatic group at the 1 position may be alkyl or alkylene.

These compounds may be easily prepared from fatty source materials including animal oils such as lard and tallow and vegetable oils such as cottonseed oil, linseed oil, soya bean oil, etc.

One procedure involves splitting the natural oils by known methods such as Twitchellizing or autoclaving to obtain the mixed fatty acids and glycerine, reacting the fatty acids with ammonia to prepare the corresponding fatty acid nitriles, reacting the nitriles with hydrogen to prepare primary aliphatic amines, reacting the primary amines with acetonylacetone to prepare the 1-alkyl-2,5-dimethylpyrroles, and then reacting the 1-alkyl-2,5-dimethylpyrroles with hydrogen to prepare the corresponding 1-alkyl-2,5-dimethylpyrrolidines.

A process for reacting fatty acids with ammonia to form nitriles as disclosed in the Ralston Patent 2,061,314 dated November 17, 1936, or other processes known to the art for this same purpose, may be employed. The hydrogenation of the nitriles to prepare primary amines may be carried out according to the process set forth in the Young et al. Patent 2,287,219 dated May 23, 1942, or by other processes known to the art. And the preparation of 1-alkyl-2,5-dimethylpyrroles from the primary amines may be carried out according to the process disclosed in our copending application Serial No. 521,122, now abandoned, which includes a reaction of the amines with acetonylacetone.

In making the 1-alkyl-2,5-dimethylpyrroles we may use primary aliphatic amines prepared by any method and having in their alkyl group at least 12 carbon atoms. The amines may be unsaturated or saturated and may be derived from any source.

In preparing the 1-alkyl-2,5-dimethylpyrrolidines the 1-alkyl-2,5-dimethylpyrroles may be placed in a suitable pressure container and mixed with a reducing catalyst such as nickel. The mixture may be subjected to a pressure of about 1000 pounds to 3000 pounds per square inch and a temperature from about 175° C. to 250° C. with agitation for a period from about one to six hours. The resulting product may be filtered to remove the catalyst and distilled or crystallized to purify it.

By using dodecylamine the 1-dodecyl-2,5-dimethylpyrrolidines are prepared; and by using octadecylamine the 1-octadecyl-2,5-dimethylpyrrolidines are prepared; etc. Included in the new family of compounds are 1-dodecyl-2,5-dimethylpyrrolidine, 1-tetradecyl-2,5-dimethylpyrrolidine, 1-hexadecyl-2,5-dimethylpyrrolidine, 1 - octadecyl - 2,5 - dimethylpyrrolidine and 1-eicosyl-2,5-dimethylpyrrolidine. The new compounds also include the corresponding compounds in which the alkyl group is unsaturated such as 1-octadecenyl-2,5-dimethylpyrrolidine and 1-octadecadienyl-2,5-dimethylpyrrolidine. We may also use mixed primary amines and in this case we will obtain mixed 1-alkyl-2,5-dimethylpyrrolidine compounds. For example, when starting from the mixed acids of tallow we may obtain a mixture containing 1-hexadecyl-2,5 - dimethylpyrrolidine, 1 - octadecyl - 2,5-dimethylpyrrolidine and 1 - octadecenyl - 2,5-dimethylpyrrolidine.

We can prepare the acetates of any of the free compounds by dissolving in alcohol and treating with concentrated acetic acid. The resulting solution may be evaporated to dryness under reduced pressure to obtain the 1-alkyl-2,5-dimethylpyrrolidine acetate. The hydrochloride and other salts of mineral or strong organic acids may be prepared in a like manner. The 1-alkyl-2,5-dimethylpyrrolidines are all high boiling liquids soluble in organic solvents and insoluble in water. They may be regarded as surface active cationic substances. The salts as well as the free compounds are useful as surface active agents, and in some cases are preferable to the free compounds, especially the acetates and the hydrochlorides.

Following are specified examples dealing with the preparation of specific compounds of the class included in our invention:

EXAMPLE 1

*1-dodecyl-2,5-dimethylpyrrolidine*

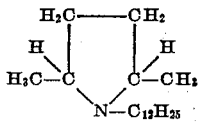

50 parts of 1-dodecyl-2,5-dimethyl-pyrrole are mixed with 1 part of a metallic nickel catalyst and hydrogenated for one hour at 1600 pounds per square inch pressure and in a temperature of 230° C. The 1-dodecyl-2,5-dimethylpyrrole is prepared by the reaction of acetonylacetone and dodecylamine. The hydrogenated product is separated from the nickel catalyst and distilled. It is a colorless liquid which boils at 107–108° at 0.3 mm. 5.3 parts of the 1-dodecyl-2,5-dimethylpyrrolidine are dissolved in 20 parts of alcohol and treated with 2.4 parts of concentrated hydrochloric acid. The resulting solution is evaporated to dryness under reduced pressure. The product, 1-dodecyl-2,5-dimethylpyrrolidine hydrochloride is crystallized from a mixture of benzene and ether. It melts at 123–125° C. and is appreciably soluble in water. The corresponding acetate is prepared and proves to be a low melting solid which is quite soluble in water.

EXAMPLE 2

*1-octadecyl-2,5-dimethylpyrrolidine*

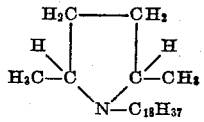

150 parts of 1-octadecyl-2,5-dimethylpyrrole are mixed with 3 parts of a metallic nickel catalyst and hydrogenated at 2900 pounds per square inch pressure and a temperature of 215° C. for 3 hours. The product is filtered and distilled. It is a colorless liquid which boils at 160° to 166° C. at 0.25 mm. and freezes at 20.8° C. 14 parts of the 1-octadecyl-2,5-dimethylpyrrolidine are dissolved in 50 parts of alcohol and treated with 5 parts of concentrated hydrochloric acid. The product is crystallized from a mixture of benzene and ether.

EXAMPLE 3

A pyrrolidine is prepared from a 1-alkyl-2,5-dimethylpyrrole, the alkyl groups being composed of both hexadecyl and octadecyl radicals. The pyrrole is hydrogenated as described in the previous examples. The mixed 1-hexadecyl- and 1-octadecyl-2,5-dimethyl-pyrrolidines boil at 135° to 175° at 0.3 mm.

It is understood that the new 1-alkyl-2,5-dimethylpyrrolidines may be prepared in various ways other than that specifically explained above and the invention may be practiced in many varied forms.

What we claim as new and desire to secure in Letters Patent is:

1. A compound of the group consisting of 1-aliphatic-2,5-dimethylpyrrolidines of the general formula

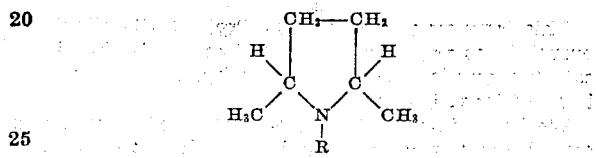

where R is a straight chain aliphatic radical containing at least 12 carbon atoms and salts thereof.

2. A compound of the group consisting of 1-dodecyl-2,5-dimethylpyrrolidine and salts thereof.

3. A compound of the group consisting of 1-octadecyl-2,5-dimethylpyrrolidine and salts thereof.

4. 1-aliphatic-2,5-dimethylpyrrolidine acetate wherein the aliphatic group contains at least 12 carbon atoms.

5. 1-aliphatic-2,5-dimethylpyrrolidine hydrochloride wherein the aliphatic group contains at least 12 carbon atoms.

ANDERSON W. RALSTON.
JAMES HARWOOD.

REFERENCES CITED

The following references are of record in the file of this patent:

UNITED STATES PATENTS

| Number | Name | Date |
| --- | --- | --- |
| 2,056,449 | Graenacher et al. | Oct. 6, 1936 |
| 2,132,902 | Lenher | Oct. 11, 1938 |
| 2,152,047 | Hahl | Mar. 28, 1939 |
| 2,362,276 | Jayne et al. | Nov. 7, 1944 |

OTHER REFERENCES

Chem. Abstracts, vol. 23, pp. 4461–4462.
Chem. Abstracts, vol. 24, pp. 3011–3012.
Chem. Abstracts, vol. 32, p. 4982.
Chem. Abstracts, vol. 34, pp. 979–980.
Chem. Abstracts, vol. 37, p. 4071.